Patented July 28, 1953

2,647,068

UNITED STATES PATENT OFFICE 2,647,068

PROCESS OF TREATING VITREOUS MATERIALS

Imre Patai, Washington, D. C.; H. Russell Bishop, administrator of the estate of said Imre Patai, deceased No Drawing. Application March 16, 1948, Serial No. 15,283

5 Claims. (Cl. 117—35)

This invention relates to improvements in vitreous materials and it consists, first, of the process of producing reflecting glass, as distinguished from light transmitting glass, by diffusing into the glass matrix a chosen metallic compound which is later converted by reduction to its metallic form, second, an article of manufacture comprising a reflecting glass wherein the mirror is a self-contained and unitary sub-surface constituent of the glass plate. The features of the instant invention are predicated upon the disclosure in an application for a U. S. A. patent for Treatment for Vitreous Materials, filed by Imre Patai, June 11, 1947, Ser. No. 754,058, now abandoned, of which this application is a continuation in part.

Insofar as the process is concerned, the invention relates to the treatment of vitreous materials, specifically glass, in order to modify its optical, electrical, and thermal properties. The carrying out of the process is based largely upon the diffusion into the glass matrix of a suitable metal compound or metal ion, especially silver compound or silver ion, which compound or ion upon reduction by heat in a critical range, will produce in the body of the glass a metallic, mirror-like stratum of varying transparency. Examples of a reducible metal compound are silver nitrate and mixtures of silver nitrate with cadmium nitrate, potassium nitrate or thorium nitrate.

As the invention concerns the product, a diversity of novel developments results from the carrying out of the process. Some of those developments, in addition to staining glass with all of the spectral colors, are the making in glass of either thick, non-transparent reflecting sub-surface layers or thin sub-surface layers of metal which are partially reflective and partially transparent, the making of mirrored patterns in glass, the making of photographic images in glass, and otherwise extending the development in a manner described below.

It has been the practice prior to the instant invention, to produce a metallic layer on the glass surface by such methods as chemical reduction, by evaporation, by cathode sputtering, etc. All of these prior art methods have the disadvantage that the metallic layer can easily be damaged or destroyed by mechanical or chemical influences. A silver mirrored surface produced by prior art methods is easily oxidable, consequently must be protected against such oxidation and from mechanical injury. Accordingly, there has been considerable need in the art for a process capable of producing metallic reflecting layers that are thoroughly imbedded in the glass matrix, which layers will not be subject to chemical attack or mechanical injury.

Specific examples of prior art activities other than noted above are stated briefly. In the U. S. patent to Arthur D. Nash, 2,281,076, of April 28, 1942, it was proposed to add small portions of silver nitrate to the molten glass batch to yield a glass, the transparency of which is only slightly reduced from what it would be if the silver nitrate were omitted, and which will, upon subsequent firing in a reducing atmosphere, be given a metallic or mirror-like surface. But the amount of the silver compound which can be added to the glass batch in order to yield optimum results, according to the teaching of that patent, is very limited because of its rendering the resultant glass piece unduly brittle, and in actual practice is not sufficient to produce a metallic layer having the density necessary to insure adequate reflecting properties.

The introduction of silver ions into glass is a step of a known process on which there is extended scientific literature. J. C. Turnbull and W. A. Weyl in their article "Staining glasses with silver: A possibility of studying inhomogeneities" (The Glass Industry, January 1940) write: "The present work is based on the well known fact that silver ions can be introduced into the finished glass by migration from the outside and may be precipitated in the glass under reducing conditions. This leads to the well-known brownish yellow colors of silver stain. * * * In the following work, the bath consisted of a mixture, 90 percent sodium nitrate and 10 percent silver nitrate, which was fused in a Pyrex beaker and heated to 800° F. * * * The glass specimen was immersed in this staining bath for 30 minutes, taken out, and allowed to cool and washed in nitric acid."

W. A. Weyl, again, in his comprehensive article, "Coloured glasses" (Journal of the Society of Glass Technology, December 1945), gives a complete survey of the literature relating to staining glass with silver. According to all of the quoted works the silver ions were introduced at relatively high temperatures, especially above 400° C. In writing, Weyl states: "The basic exchange between positive Na and positive Ag ions is lively as low as 400° C. and the migration of neutral silver atoms is noticeable even below 200° C."

The introduction of silver ions into glass at elevated temperature and the subsequent reducing was always used for yellow staining of glass, and never was successfully used to produce reflecting metallic layers. In his article in The Glass Industry, July 1947, page 350, Weyl further states: "The reduction of metallic ions present in a glass, as described in the previous chapter depends on so many variables that uniform films of high reflectivity cannot be expected from this method."

Despite the discouraging experiences outlined above, it has been found by investigations leading to the present invention that highly reflective, uniform metallic films or strata can be formed by introducing silver compounds or silver ions in common, commercial soft soda-glass, i. e., that glass known to the art as having a sodium content higher than 10%, and then subjecting the impregnated glass to a reducing temperature. Therefore, it is an object of the invention to provide a process whereby the optical, electrical and thermal properties of vitreous materials such as glass, may be altered by introducing metallic elements or compounds into such materials to produce a reflecting metallic layer that is thoroughly embedded in the body of the particular material.

Another object of the invention is to provide a process wherein a solidified glass or other vitreous piece is brought into physical contact with a silver salt either in a molten or unmolten state, for the purpose of producing a diffusion or migration of the silver into the substance of the vitreous piece, the restricted temperature involved in this diffusion step being superseded by a higher and reducing temperature to which the impregnated piece is exposed in the final step.

Another object of the invention is to confine the diffusion step to a limited temperature range, by the regulation of which in its prescribed limits and the time of exposure thereto, the impregnated amount of metallic salt determines the thickness and the reflectivity of the sub-surface stratum developed in the final step of reduction.

Another object of the invention is to provide a vitreous product wherein a thin, sub-surface, metallic stratum adjacent to at least one of the surfaces of the product, determines certain optical, electrical and thermal properties thereof.

These and other objects of the invention are achieved by the following basic process. A bath of molten silver nitrate, herein identified as the diffusion bath, was prepared by heating the silver nitrate in a container over a flame until it acquired an internal temperature of 212° C. to 300° C. A piece of soft soda-glass, the so-called non-corrosive commercial type, was immersed in this bath from 3 to 10 minutes at a temperature of 220° C. The chemical characteristic of the glass resulting from the foregoing diffusion step probably is expressed by the formula:

$$Na_2SiO_4 + 2AgNO_3 = Ag_2SiO_4 + 2NaNO_3$$

Thereupon the glass was removed from the bath, cooled and then washed thoroughly with a solution of nitric acid and distilled water to remove the excess substance. Up to this point, the glass showed no visible change, excepting that the reflectivity of the surface was a very little higher than originally. The glass piece was then heated in a reducing atmosphere at 400° C. to 700° C., preferably at 600° C. The result was a uniform, highly reflective metallic layer, completely embedded in the glass matrix and occupying a thin stratum immediately beneath the adjacent surface, the chemical characteristic of the glass then probably being expressed by the following formula:

$$Ag_2SiO_4 + 2H_2 = 2H_2O + 2Ag + SiO_2$$

It had a reflection coefficient of about 55% and a transparency of about 30%, which values are nearly equal to the values of the thin, metallic films obtained by the previously mentioned evaporation, cathode sputtering, chemical processes, etc. on the glass surface. This embedded or sub-surface layer could not be removed by the usual mechanical treatment, such as scraping, rubbing or the like, and could not be easily dissolved even in a 50% solution of nitric acid. The thickness of the embedded metallic layer and the resulting optical properties of the glass depend on the temperature of the diffusion bath and the time of diffusion.

It was observed that the formation of the uniform, reflecting layer is more perfect when the diffusion bath is kept at the lower portion of the 212° C. to 300° C. range, and the diffusion of silver occurs even below 212° C., thus below the melting point of silver nitrate, if the glass is in physical contact with the salt. The diffusion is, of course, in this case, slower. To this end it was found desirable to introduce modification 1, consisting of adding such chemical constituents to the silver nitrate as will lower its melting point. For example, the addition of potassium nitrate, sodium nitrate, calcium nitrate, phosphate, etc. accomplished the purpose. A very favorable salt-mixture is, for example: 80% silver nitrate, 20% potassium nitrate. This mixed salt or compound has a melting point below 160° C.

By using mixed silver salts and lower temperatures than the melting point of the silver nitrate alone, the diffusing step required more time, but the metallic layer produced by the step of reduction is very clean and perfect. Thus it will be noted that the diffusion temperature plays an essential part in the whole process. If allowed to exceed the 300° C. limit, and even to exceed 250° C. using some types of commercial glasses, the produced metallic layers are opaque or contain black spots, or the back side of the layer is dark and has but little reflectivity. This failure to appreciate the significance of the instant critical temperature range for the step of diffusion is regarded as the reason why earlier experimenters could not obtain uniform, highly reflective metallic layers in glass.

The result of the process necessarily depends to an extent on the composition of the glass. As stated above, in the performance of the process, a splendid result was obtained by using a soda-glass, the composition of which included boron, alumina, barium, potassium and calcium. It was not possible at the time to find any commercial soda-glass in which clean, uniform, strong acid-insoluble metallic layers, reflective on both sides, could be produced in an experimental diffusing bath temperature range above 250° C. to 300° C., the upper limit depending on variations in the composition of the glass.

In anticipation of what occurs when a glass piece is immersed in the diffusion bath, it is possible that the interaction between the inherently amorphous glass and the metallic compound or salt is a pure diffusion in its physical sense. It is also possible that the diffusion step takes place by virtue of ionic exchange between the salt and glass. According to the foregoing quotation from Weyl, the ion exchange between positive Ag (silver) ion and positive Na (sodium) ion is noticeable at about 400° C.; and at about 200° C. only the neutral silver atoms migrate into the glass. It is thus possible that in the instant process it is not the Ag ions but the silver nitrate molecules that migrate into the glass. Accordingly, the term diffusion is used throughout the specification and claims as descriptive of that mechanism which causes the silver or silver compound to impregnate the glass when the glass is brought into physical contact with the silver salt at an elevated temperature of the silver salt, i. e., the molten or unmolten diffusion bath. It is preferred not to be bound to any exact explanation of the chemical or physical reactions that may be involved.

Reference is now made to modification 2. It is stated above that the embedded reflective metallic stratum after reduction in an atmosphere of 400° C. to 700° C. could not be easily dissolved even in a 50% solution of nitric acid. The solubility of said stratum depends also on the temperature of the gas atmosphere in which the reduction occurs. For instance, by using the flame of so-called natural gas which contains a high percentage of methane, as the reducing atmosphere, the metallic stratum, formed as the result of the reduction, although resistant to mechanical attrition, proved to be more easily soluble in the 50% solution of nitric acid.

In most instances the performance of the process will be required to produce reflective glass in which the metallic sub-surface strata are highly resistant to chemicals such as acids. However, for some purposes a certain solubility is useful. Therefore, by carrying out the reducing step in a methane gas flame, the glass product will respond to the action of a nitric acid solution more readily than if reduced in a hydrogen gas flame. By masking the surface of such glass with a configurated mask made in accordance with a wanted design and then subjecting it to the etching action of the acid solution, unwanted parts of the metallic stratum will be dissolved, leaving in relief the design as an integral, sub-surface embodiment of the glass.

Modification 3 of the process was carried out in the following manner. Instead of immersing the piece of glass in a molten silver salt diffusion bath as in the basic example, a prepared water solution of silver nitrate or mixture of silver nitrate and potassium nitrate was sprayed or painted on the surface of a solidified piece of glass which was warmed. After evaporation of the water a consistent layer of salt remained on the glass surface. The glass was then heated until the salt deposit melted, and the glass was kept at that melting temperature or slightly above for some minutes. After cooling the glass, the excess salt was removed, the glass washed and subsequently reduced, both in accordance with the basic example.

In this modification it is possible to substitute the water vehicle for the silver nitrate by suspending the salt in acetone or some other volatile organic medium. The resulting suspension is sprayed or painted onto the surface of the glass, the remaining steps of the process being carried out according to modification 3. At this point it is desirable to add that to obtain a reducible silver compound, which is diffused into the glass, it is not necessary to use molten silver nitrate or unmolten silver salt at all. Unmolten silver nitrate produces a diffused and reducible layer, and besides silver nitrate every silver salt capable of yielding metallic silver by reduction can be used, for instance silver chloride and silver sulphate.

Reference is made above to controlling the thickness of the metallic layer by regulating the temperature of the diffusion bath and the time of immersion of the glass therein. This facility gives origin to modification 4, which relates more directly to the product or article of manufacture rather than to the process. By so regulating the temperature of the bath and the time of diffusion, as has been said, the glass piece may be made to eventuate with a simultaneously partially reflective and partially transparent stratum. A unique application of this result is in protective eye-glasses. The unwanted light is reflected and not absorbed, consequently the lens remains relatively cool. Prior art protective eye-glasses reduced the light reaching the eyes mainly by absorption, this being associated with an inevitable increase in the temperature of the lens.

Modification 5 enables the making of a vitreous article of ornamental manufacture by use of light-sensitive glass. This is begun by the performance of the basic process. It is known that silver nitrate and also other silver salts are light-sensitive. If irradiated by ultra-violet light they become easier to reduce. This phenomenon can be used to produce mirrored patterns and images in glass in a manner differing from modification 2. The steps will comprise immersing the glass piece, as has been stated, in a diffusion bath according to the basic process. The glass is cooled and washed, the surface is then irradiated in some parts, either through configurated masking as in modification 2, or through a photographic negative. The effect of covering the material with a photographic negative, is to vary the rate of reduction of the diffused metallic compound according to the grading of the negative. The compound under the dark parts of the negative are slow in becoming reduced while the compound under the light parts are relatively easier to reduce. The irradiated parts become easier to reduce, and with respect to those parts that are not irradiated, the reduction step is interrupted or slowed. If the step of irradiation is performed through a photographic negative, the previously deposited silver compound will be variously affected by the ultra-violet light in the manner just described. The step of reduction will literally burn the photographic image into the glass, which thereupon occupies a permanent, sub-surface stratum immediately adjacent to the surface.

Modification 6 comprises the employment of the process in the manufacture of electrical resistors because the embedded sub-surface metallic layers apparently are quite consistent as to density. Due to the colloidal structure of the metallic layer, its electrical resistance is initially high. This high resistance can be lowered to some extent by heating the glass for a period necessary to cause crystallization of the particles of silver.

In brief summarization of the invention the merits of the latter reside both in the specific process and in the product thereof. It has been indicated that silver nitrate can be used alone, or may comprise the main constituent of the diffusing bath as outlined in the several modifications. From those it is understood that other silver salts of mixed composition can be used with good results, provided that the temperature of the diffusion bath as applied to the foregoing mixture remains within a 150° C. to 300° C. range, and is never permitted to exceed 300° C., this latter limit being given to account for expected differences in the composition of various pieces of glass.

As to the product of the process, the resulting metallic mirror is highly resistant to mechanical or chemical injury because the mirror surface is completely embedded in the glass. Accordingly, it is unnecessary to provide a protective coating for the mirrored surface, as in the prior art, to prevent oxidation. At this point it is noted further that when embedded in a proper composition of glass, the metal will not oxidize when the finished product is subjected to exceedingly high temperatures, but a further reduction of the metal can occur. Thus, mirror glass bodies produced by the process herein described are admirably suited for use as searchlight reflectors and incandescent lamps with reflecting walls.

Obviously many modifications and variations of the present invention are possible in the light of the above teachings. It is therefore to be understood that within the scope of the appended claims the invention may be practiced otherwise than as specifically described.

What is claimed is:

1. The process of producing a mirror glass, comprising selecting a glass having a sodium content higher than ten percent, bringing the glass into physical contact with a substance containing silver nitrate, heating the glass to a temperature not exceeding 300° C. to cause a diffusion of the silver nitrate into the glass, removing the excess substance from the glass, and heating the glass in a reducing atmosphere of about 600° C. to produce a metallic silver transparent stratum.

2. The process of producing a mirror glass, comprising bringing a solid piece of glass having a sodium content higher than ten percent into physical contact with silver nitrate, heating the glass to a temperature not exceeding 300° C., cooling said glass, removing all excess substance from the surface of the glass, and heating said cleaned glass in a reducing atmosphere of about 600° C. to effect a reduction of the diffused silver material into a transparent stratum.

3. The process of producing a mirror glass, comprising bringing a solid piece of glass having a sodium content higher than ten percent into physical contact with a salt containing silver nitrate, heating the glass to a temperature not exceeding 300° C., removing all excess substance from the surface of the glass, and heating said cleaned glass in a reducing atmosphere of about 600° C. to effect a reduction of the diffused silver material into a transparent stratum.

4. The process of producing a mirror glass, comprising bringing a solid piece of glass having a sodium content higher than ten percent into physical contact with a mixed salt containing silver nitrate and potassium nitrate, heating said glass to a temperature not exceeding 300° C., removing all excess substance from the surface of the glass, and heating said cleaned glass in a reducing atmosphere of about 600° C. to effect a reduction of the diffused silver material into a transparent stratum.

5. The process of producing a mirror glass, comprising bringing a solid piece of glass having a sodium content higher than ten percent into physical contact with a mixed salt of 80% silver nitrate, and 20% potassium nitrate, heating the glass to a temperature not exceeding 300° C., removing all excess substance from the surface of the glass, and heating said cleaned glass in a reducing atmosphere of about 600° C. to effect a reduction of the diffused silver material into a transparent stratum.

IMRE PATAI.

References Cited in the file of this patent

UNITED STATES PATENTS

| Number | Name | Date |
| --- | --- | --- |
| 728,063 | Wilson | May 12, 1903 |
| 906,229 | Hoessle | Dec. 8, 1908 |
| 916,236 | West et al. | Mar. 23, 1909 |
| 1,372,258 | Tomlinson | Mar. 22, 1921 |
| 1,574,544 | Bart | Feb. 23, 1926 |
| 1,653,040 | Drake | Dec. 20, 1927 |
| 1,884,665 | Greiner | Oct. 25, 1932 |
| 1,885,232 | Colbert | Nov. 1, 1932 |
| 2,087,802 | Bayer-Krucsay | July 20, 1937 |
| 2,158,561 | Biggs | May 16, 1939 |
| 2,179,491 | Cain | Nov. 14, 1939 |
| 2,181,926 | Tiger | Dec. 25, 1939 |
| 2,210,806 | Etbauer | Aug. 6, 1940 |
| 2,214,365 | Flynn et al. | Sept. 10, 1940 |
| 2,220,882 | Bennes | Nov. 12, 1940 |
| 2,233,622 | Lytle | Mar. 4, 1941 |
| 2,344,250 | Jones | Mar. 14, 1944 |
| 2,367,903 | Trevail et al. | Jan. 23, 1945 |